United States Patent
Siemaszko et al.

(10) Patent No.: US 12,327,675 B2
(45) Date of Patent: Jun. 10, 2025

(54) TRANSFORMER DC MAGNETIZATION DETECTION AND MITIGATION THROUGH VIBRATION MEASUREMENT

(71) Applicant: Hitachi Energy Ltd, Zürich (CH)

(72) Inventors: Daniel Siemaszko, Ste-Croix (CH); Stefanie Heinig, Basel (CH); Juergen Steinke, Albbruck (DE); Noemi Hubatka, Zürich (CH); Remo Baumann, Lenzburg (CH)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/851,287

(22) PCT Filed: Mar. 10, 2023

(86) PCT No.: PCT/EP2023/056239
§ 371 (c)(1),
(2) Date: Sep. 26, 2024

(87) PCT Pub. No.: WO2023/186497
PCT Pub. Date: Oct. 5, 2023

(65) Prior Publication Data
US 2025/0111989 A1    Apr. 3, 2025

(30) Foreign Application Priority Data
Mar. 31, 2022   (EP) .................................... 22166091

(51) Int. Cl.
H01F 27/42    (2006.01)
G01N 29/12   (2006.01)

(52) U.S. Cl.
CPC ............. *H01F 27/42* (2013.01); *G01N 29/12* (2013.01); *G01N 2291/02863* (2013.01)

(58) Field of Classification Search
CPC .......... G01N 29/12; G01N 2291/02863; H01F 13/00; H01F 13/006; H01F 27/42–427
See application file for complete search history.

(56) References Cited

U.S. PATENT DOCUMENTS

| 8,849,587 B1* | 9/2014 | Lightle .................... G01H 1/00 702/56 |
| 2014/0218012 A1* | 8/2014 | Umetani ................ G01R 33/02 324/117 R |
| 2015/0028827 A1* | 1/2015 | Peck, Jr. ............ G01R 33/0011 323/250 |

FOREIGN PATENT DOCUMENTS

| CN | 202917950 U | 5/2013 |
| CN | 105428000 A | 3/2016 |

(Continued)

OTHER PUBLICATIONS

Decision for Grant of Patent, Korean Patent Application No. 10-2024-7032536, mailed Oct. 21, 2024, 8 pages.

(Continued)

*Primary Examiner* — Jared Fureman
*Assistant Examiner* — Christopher J Clark
(74) *Attorney, Agent, or Firm* — Sage Patent Group (57) ABSTRACT

The present disclosure relates to a method for detecting a DC magnetization in a transformer and controlling the transformer, the method including: sensing, using at least one vibration sensor, at least one vibration on at least one surface of the transformer or on at least one surface of a component connected to the transformer; measuring the sensed at least one vibration; detecting, based on the measured at least one vibration, the DC magnetization in the transformer; and controlling, based on the detected DC magnetization, the transformer. The present disclosure also relates to a respective device and system.

13 Claims, 6 Drawing Sheets

(56) References Cited

FOREIGN PATENT DOCUMENTS

| | | | |
|---|---|---|---|
| CN | 109031072 A | 12/2018 | |
| CN | 109212369 A | 1/2019 | |
| DE | 4312764 A1 | 10/1994 | |
| DE | 102010053100 A1 | 6/2011 | |
| EP | 1786083 A1 * | 5/2007 | ......... G05B 23/0245 |
| EP | 4254446 A1 | 10/2023 | |
| JP | H07-280907 A | 10/1995 | |
| JP | H11162769 A | 6/1999 | |
| JP | 2008-228537 A | 9/2008 | |
| JP | 2016-116423 A | 6/2016 | |
| JP | 2017-194290 A | 10/2017 | |
| WO | 2018/042896 A1 | 3/2018 | |
| WO | 2022042812 A1 | 3/2022 | |

OTHER PUBLICATIONS

International Search Report and Written Opinion of the International Searching Authority, International Application No. PCT/EP2023/056239, mailed May 19, 2023, 13 pages.

International Preliminary Report on Patentability, International Application No. PCT/EP2023/056239, mailed Jun. 18, 2024, 17 pages.

Schrittwieser et al: "Novel Principle for Flux Sensing in the Application of a DC+ AC Current Sensor", IEEE Transactions on Industry Applications, vol. 51, No. 5, Sep. 1, 2015, XP011669114, ISSN: 0093-9994, 11 pages.

Lu et al: "Study on the Influence of Temperature on Transformer Core Vibration", 2018 IEEE International Power Modulator and High Voltage Conference, Jun. 3, 2018, XP033676035, 5 pages.

Bauer et al: "Demagnetization of Current Transformers Using PWM Burden", IEEE Transactions on Magnetics, vol. 51, No. 1, Jan. 1, 2015, XP011572282, ISSN: 0018-9464, 4 pages.

Japanese Office Action and English Translation, Japanese Patent Application No. 2024-557663, mailed Mar. 24, 2025, 10 pages.

Chinese Search Report and English Translation, Chinese Patent Application No. 2023800299792 mailed Mar. 21, 2025, 6 pages.

\* cited by examiner

TRANSFORMER DC MAGNETIZATION DETECTION AND MITIGATION THROUGH VIBRATION MEASUREMENT

CROSS-REFERENCE TO RELATED APPLICATIONS

This application is a 35 U.S.C. § 371 national stage application of PCT International Application No. PCT/EP2023/056239 filed on Mar. 10, 2023, which in turn claims priority to European Patent Application No. 22166091.3, filed on Mar. 31, 2022, the disclosures and content of which are incorporated by reference herein in their entireties.

TECHNICAL FIELD

The present disclosure relates to a method, a device, and a system for detecting a DC magnetization in a transformer, in particular an MFT, and controlling the transformer.

BACKGROUND

In a transformer, in particular a large transformer, a DC magnetization caused by fields external to the transformer may drive the core into saturation and results in a dramatic increase of the level of higher order harmonics due to a high non-linearity. In contrast, a medium frequency transformer, MFT, typically operated using transformer excitation signals with frequencies between 1 and 75 kHz, generates, among others, a high level of fundamental frequency component of the transformer excitation signal, leading to a considerably unpleasant noise within an audible frequency range when the core is saturated.

The saturation may be mitigated by using series-connected capacitors which remove DC components, but such solution is impractical due to bulky high-current capacitors. Alternatively, an acoustic sensor may be considered for detecting a saturation. The measured data may be used to adjust the transformer excitation signals. However, a challenge is posed when several MFTs are operated at the same time in the vicinity as the acoustic sensors may be sensitive to the vibrations generated by the neighbouring transformers and/or the ambient noises. In such situation, it is of importance to locate the origin of the vibration, so as to apply a proper control mitigation action.

Thus, there is a need to improve a method, a device, and a system to detect a DC magnetization in a transformer, in particular an MFT, and to control the transformer accordingly.

SUMMARY

The present disclosure relates to a method, a device, and a system to detect a DC magnetization in a transformer, in particular an MFT, and to control the transformer accordingly.

Various exemplary embodiments of the present disclosure disclosed herein are directed to providing features that will become readily apparent by reference to the following description when taken in conjunction with the accompanying drawings. In accordance with various embodiments, exemplary systems, methods, and devices are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

In the following, exemplary embodiments of the disclosure will be described. It is noted that some aspects of any one of the described embodiments may also be found in some other embodiments unless otherwise stated or obvious. However, for increased intelligibility, each aspect will only be described in detail when first mentioned and any repeated description of the same aspect will be omitted.

The present disclosure relates to a method for detecting a DC magnetization in a transformer and controlling the transformer, the method comprising: sensing, using at least one vibration sensor, at least one vibration on at least one surface of the transformer or on at least one surface of a component connected to the transformer; measuring the sensed at least one vibration; detecting, based on the measured at least one vibration, the DC magnetization in the transformer; and controlling, based on the detected DC magnetization, the transformer.

According to an embodiment, the vibration sensor is a piezoelectric sensor, in particular a piezoelectric accelerometer.

According to an embodiment, the at least one vibration is generated by the transformer.

According to an embodiment, the detecting the DC magnetization in the transformer comprises identifying, from the measured at least one vibration, a first signal vibrating at a first frequency and/or a second signal vibrating at a second frequency.

According to an embodiment, the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

According to an embodiment, the controlling the transformer comprises modifying a pulse pattern of the alternating signal on the primary side of the transformer and/or the secondary side of the transformer.

According to an embodiment, the method further comprises computing at least one parameter, in particular an error correction factor.

According to an embodiment, the controlling the transformer is or comprises controlling at least one of voltage, in particular the voltage applied to the transformer, flux, in particular the flux through the core of the transformer, or current. According to an embodiment, the controlling the transformer is or comprises generating at least one signal being an input to the transformer. According to an embodiment, the controlling the transformer is or comprises generating at least one signal being an input to a control loop comprising a model, in particular a mathematical model, more particularly a transfer function, describing an electrical behavioural characteristic of the transformer. According to an embodiment, the generating the at least one signal is or comprises adjusting the at least one signal based on the obtained and/or determined data. According to an embodiment, the at least one signal is at least one of voltage, in particular the voltage applied to the transformer, flux, in particular the flux through the core of the transformer, or current.

The present disclosure also relates to a device for detecting a DC magnetization in a transformer and controlling the transformer, the device comprising: at least one sensor being configured to sense at least one vibration on at least one surface of the transformer or on at least one surface of a component connected to the transformer; and a processor being configured to: measure the sensed at least one vibration; detect, based on the measured at least one vibration, the DC magnetization in the transformer; and control, based on the detected DC magnetization, the transformer.

According to an embodiment, the vibration sensor is a piezoelectric sensor, in particular a piezoelectric accelerometer.

According to an embodiment, the at least one vibration is generated by the transformer.

According to an embodiment, the processor is configured to detect the DC magnetization in the transformer by identifying, from the measured at least one vibration, a first signal vibrating at a first frequency and/or a second signal vibrating at a second frequency.

According to an embodiment, the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

According to an embodiment, the processor is configured to control the transformer by modifying a pulse pattern of the alternating signal on the primary side of the transformer and/or the secondary side of the transformer.

According to an embodiment, the processor is further configured to compute at least one parameter, in particular an error correction factor.

According to an embodiment, the processor is configured to control the transformer by controlling at least one of voltage, in particular the voltage applied to the transformer, flux, in particular the flux through the core of the transformer, or current.

According to an embodiment, the processor is configured to control the transformer by generating at least one signal being an input to the transformer. According to an embodiment, the processor is configured to control the transformer by generating at least one signal being an input to a control loop comprising a model, in particular a mathematical model, more particularly a transfer function, describing an electrical behavioural characteristic of the transformer. According to an embodiment, the processor is configured to generate the at least one signal by adjusting the at least one signal based on the obtained and/or determined data. According to an embodiment, the at least one signal is at least one of voltage, in particular the voltage applied to the transformer, flux, in particular the flux through the core of the transformer, or current.

The present disclosure also relates to a device for detecting a DC magnetization in a transformer and controlling the transformer, the device comprising: a vibration sensor configured to sense at least one vibration on at least one surface of the transformer or on at least one surface of a component connected to the transformer; a measurement unit configured to measure the sensed at least one vibration; a detection unit configured to detect, based on the measured at least one vibration, the DC magnetization in the transformer; and a control unit configured to control, based on the detected DC magnetization, the transformer.

According to an embodiment, the vibration sensor is a piezoelectric sensor, in particular a piezoelectric accelerometer.

According to an embodiment, the at least one vibration is generated by the transformer.

According to an embodiment, the detection unit is configured to detect the DC magnetization in the transformer by identifying, from the measured at least one vibration, a first signal vibrating at a first frequency and/or a second signal vibrating at a second frequency.

According to an embodiment, the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

According to an embodiment, the control unit is configured to control the transformer by modifying a pulse pattern of the alternating signal on the primary side of the transformer and/or the secondary side of the transformer.

According to an embodiment, the device further comprises a computing unit configured to compute at least one parameter, in particular an error correction factor.

According to an embodiment, the control unit is configured to control the transformer by controlling at least one of voltage, in particular the voltage applied to the transformer, flux, in particular the flux through the core of the transformer, or current.

According to an embodiment, the control unit is configured to control the transformer by generating at least one signal being an input to the transformer.

According to an embodiment, the control unit is configured to control the transformer by generating at least one signal being an input to a control loop comprising a model, in particular a mathematical model, more particularly a transfer function, describing an electrical behavioural characteristic of the transformer.

According to an embodiment, the control unit is configured to generate the at least one signal by adjusting the at least one signal based on the obtained and/or determined data.

According to an embodiment, the at least one signal is at least one of voltage, in particular the voltage applied to the transformer, flux, in particular the flux through the core of the transformer, or current.

According to an embodiment, the control unit is configured to control the transformer by controlling at least one of voltage, in particular the voltage applied to the transformer, flux, in particular the flux through the core of the transformer, or current. According to an embodiment, the control unit is configured to control the transformer by generating at least one signal being an input to the transformer. According to an embodiment, the control unit is configured to control the transformer by generating at least one signal being an input to a control loop comprising a model, in particular a mathematical model, more particularly a transfer function, describing an electrical behavioural characteristic of the transformer. According to an embodiment, the control unit is configured to generate the at least one signal by adjusting the at least one signal based on the obtained and/or determined data. According to an embodiment, the at least one signal is at least one of voltage, in particular the voltage applied to the transformer, flux, in particular the flux through the core of the transformer, or current.

The present disclosure further relates to a system comprising a transformer and the device for detecting a DC magnetization in the transformer and controlling the transformer, the device comprising: a sensor configured to sense at least one vibration on at least one surface of the transformer or on at least one surface of a component connected to the transformer; and a processor configured to: measure the sensed at least one vibration; detect, based on the measured at least one vibration, the DC magnetization in the transformer; and control, based on the detected DC magnetization, the transformer.

The present disclosure further relates to a system comprising a transformer and the device for detecting a DC magnetization in the transformer and controlling the transformer, the device comprising: a vibration sensor configured to sense at least one vibration on at least one surface of the transformer or on at least one surface of a component connected to the transformer; a measurement unit configured to measure the sensed at least one vibration; a detection unit configured to detect, based on the measured at least one vibration, the DC magnetization in the transformer; and a control unit configured to control, based on the detected DC magnetization, the transformer.

A typical medium frequency transformer (MFT) is designed for low core losses, which results in the MFT staying in the linear magnetization range and keeping more margin to the saturated part of the B-H-curve than usually applied to large transformers, thereby preventing the dc-magnetization currents from driving the core immediately into saturation, at least not for relatively small values compared with the design peak ac magnetization current, e.g. 10% of the peak ac magnetization current. The DC magnetization is often seen in transformers with substantial air gap, where the non-symmetrical magnetization causes vibration at the fundamental excitation frequency. Said DC magnetization currents are produced when, among other circumstances, there exists small non-ideal control conditions, including non-identical time delays in the MFT switching pulse distribution, causing an imbalance in voltage seconds and a small DC voltage component. Said DC magnetizing current could lead to the saturation of the MFT, during which, among others, the amplitude of the fundamental switching frequency (corresponding to the frequency of the excitation signal applied to the transformer) increases. As an MFT is typically operated between 1 and 75 kHz, comprising an audible frequency range to human, a saturated MFT emits a considerably unpleasant noise.

For a 50 Hz/60 Hz transformer such a low frequency is not weighted very high in the dBA scale. However, the increased amplitude of the fundamental frequency component of an MFT operating e.g. at 3 kHz, which is weighted very high in the audible spectrum compared to the regular lowest frequency of 6 kHz, may cause a noise pollution.

In contrary, when the MFT operates in a non-saturated state a noticeably small second harmonic, among others, is generated. An embodiment of the method to detect a DC magnetization in a transformer, in particular an MFT, and to control the transformer is illustrated in FIG. 1.

Figure 1:
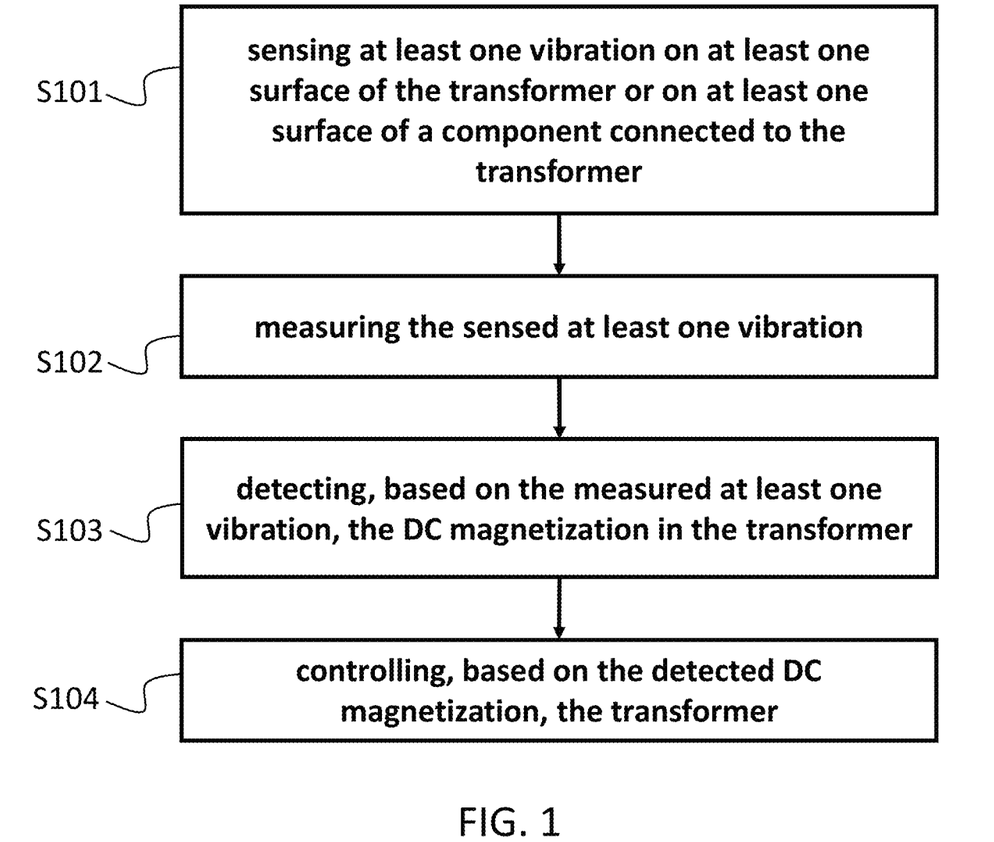
FIG. 1 illustrates a flow chart of the method according to an embodiment of the present disclosure.

FIG. 1 illustrates a flow chart of the method according to an embodiment of the present disclosure. Block S101 performs the sensing at least one vibration on at least one surface of the transformer or on at least one surface of a component connected to the transformer. Block S102 performs the measuring, the sensed at least one vibration. Block S103 performs the detecting, based on the measured at least one vibration, the DC magnetization in the transformer. Block S104 performs the controlling, based on the detected DC magnetization, the transformer.

According to an embodiment, the at least one vibration is generated by the transformer.

According to an embodiment, the detecting the DC magnetization in the transformer comprises identifying, from the measured at least one vibration, a first signal vibrating at a first frequency and/or a second signal vibrating at a second frequency.

According to an embodiment, the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

According to an embodiment, the controlling the transformer comprises modifying a pulse pattern of the alternating signal on the primary side of the transformer and/or the secondary side of the transformer.

According to an embodiment, the method further comprises computing at least one parameter, in particular an error correction factor.

According to an embodiment, the controlling the transformer is or comprises controlling at least one of voltage, in particular the voltage applied to the transformer, flux, in particular the flux through the core of the transformer, or current. According to an embodiment, the controlling the transformer is or comprises generating at least one signal being an input to the transformer. According to an embodiment, the controlling the transformer is or comprises generating at least one signal being an input to a control loop comprising a model, in particular a mathematical model, more particularly a transfer function, describing an electrical behavioural characteristic of the transformer. According to an embodiment, the generating the at least one signal is or comprises adjusting the at least one signal based on the obtained and/or determined data. According to an embodiment, the at least one signal is at least one of voltage, in particular the voltage applied to the transformer, flux, in particular the flux through the core of the transformer, or current.

Figure 2:
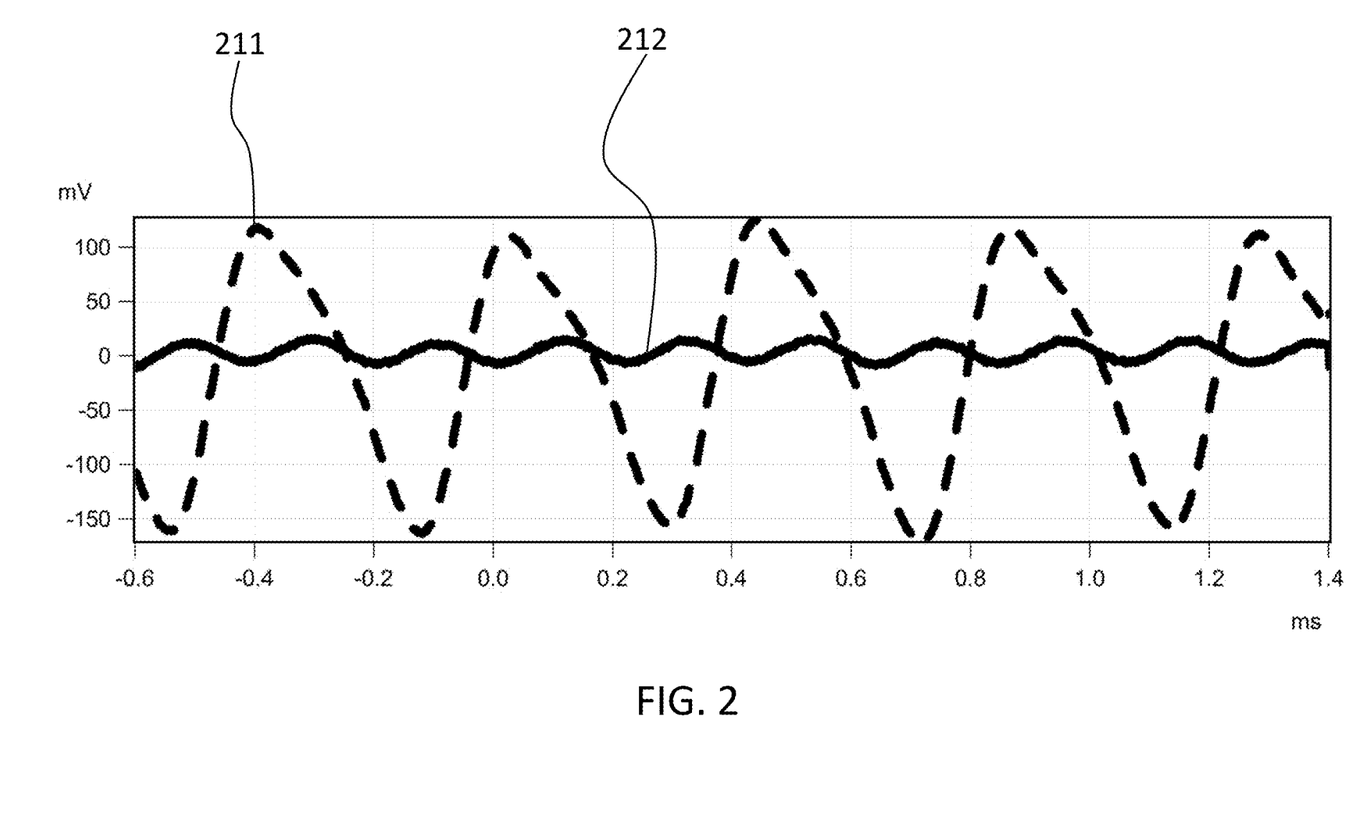
FIG. 2 illustrates measurements obtained using the piezoelectric sensor used in the method according to an embodiment of the present disclosure.

According to an embodiment, the at least one vibration sensor is a piezoelectric sensor, in particular a piezoelectric accelerometer, placed on a vibrating object, e.g. a mechanical component attached to at least one surface of the transformer, in particular the core of an MFT. According to an embodiment, the at least one vibration sensor is any other sensor being relatively more sensitive to the vibration of a component to which the at least one vibration is attached than the vibration propagating through the air. According to an embodiment, the at least one vibration sensor generates an electric signal that reflects the frequency and amplitude of the vibration. This is typically a fundamental sinewave that goes along with the switching frequency of the voltage applied to the MFT, in particular to the primary side and the secondary side. When the MFT core is in saturation, in particular a DC magnetization, a strong fundamental frequency can be detected, whereas a non-saturated core only sees a small second harmonic as illustrated in FIG. 2. According to an embodiment, the DC magnetization is caused by fields external to the transformer driving the core of the MFT into saturation and results in an increase of the level of higher order harmonics due to the high non-linearity.

FIG. 2 illustrates measurements obtained using the piezoelectric sensor used in the method according to an embodiment of the present disclosure. A first measurement 211 corresponds to the output of the piezoelectric sensor obtained during which the MFT core is in saturation and a second measurement 212 corresponds to the output of the piezoelectric sensor obtained during which the MFT core is saturated. This result shows that operation with saturation can be easily distinguished from non-saturated operation.

It is understood by the skilled person that the piezoelectric sensor may be attached to or placed on any vibrating object, wherein the vibration of the vibrating object is caused by or is related to, directly or indirectly, the transformer to be controlled based on said vibration measurements, i.e. measured vibrations are or comprise vibrations generated by the transformer and/or the propagated vibrations generated by the transformer. According to an embodiment, the vibrating object is an MFT.

Figure 3:
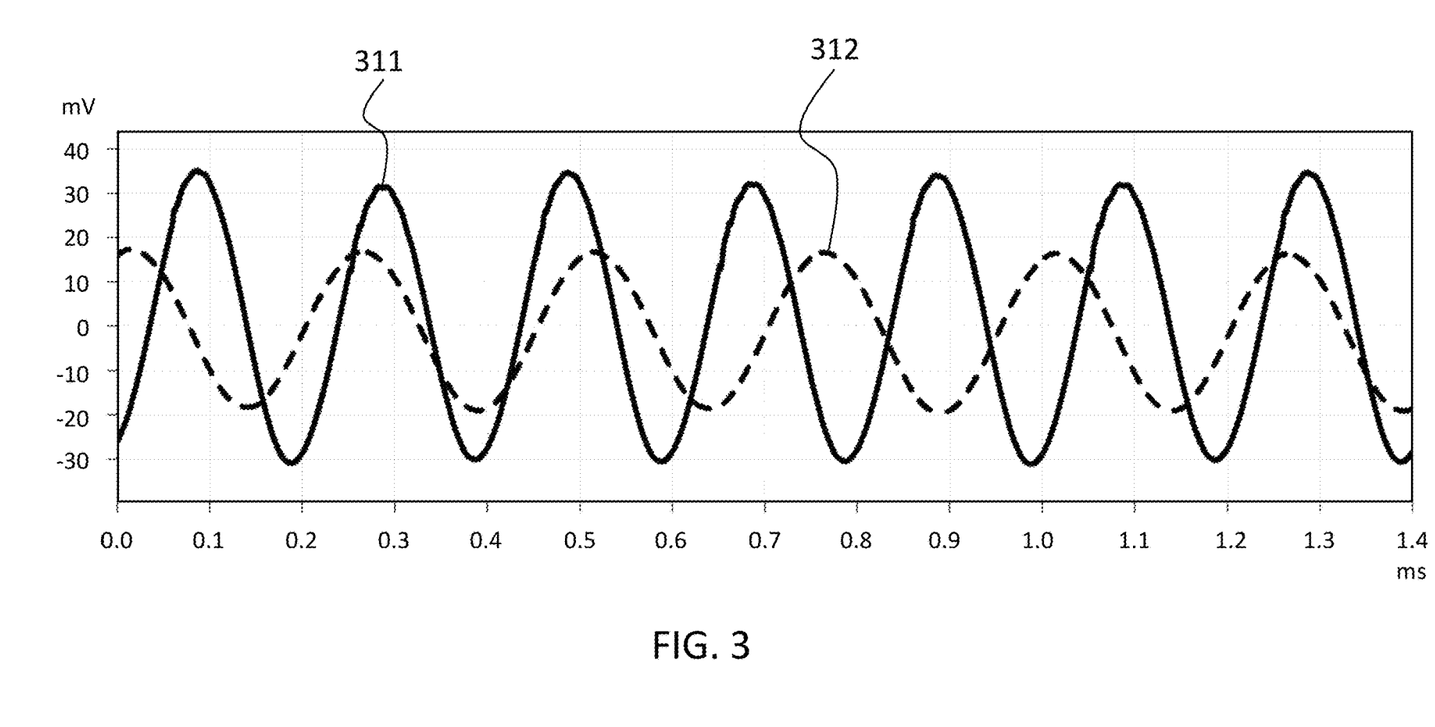
FIG. 3 illustrates vibration measurements obtained using piezoelectric sensors attached on a transformer according to an embodiment of the present disclosure.

FIG. 3 illustrates vibration measurements obtained using piezoelectric sensors attached on a transformer according to an embodiment of the present disclosure. In particular, the considered transformer is a dual active bridge, DAB, solid state transformer, SST, operating in reduced-power back-to-back configuration. The SST comprises a first MFT operating at 2 kHz and a second MFT operating at 2.5 kHz. The first MFT is in the vicinity of the second MFT. A piezoelectric sensor is attached to each of said MFTs inside the SST. FIG. 3 illustrates vibration measurements obtained using the piezoelectric sensors attached to each of said MFTs inside the SST. The solid line in 311 refers to the vibration sensor on the 2.5 kHz MFT and the dashed line 312 refers to the vibration sensor on the 2 kHz MFT. The vibration measurements show the obtained sinusoidal output waveforms oscillate at two distinguishable different frequencies, 2 kHz and 2.5 kHz, without interferences between them. Such observation leads to the qualitative conclusion that the piezoelectric sensors are insensitive to the noise generated by the neighbouring MFT and the environment, i.e., they are not sensitive to noise transmitted through air.

Figure 4:
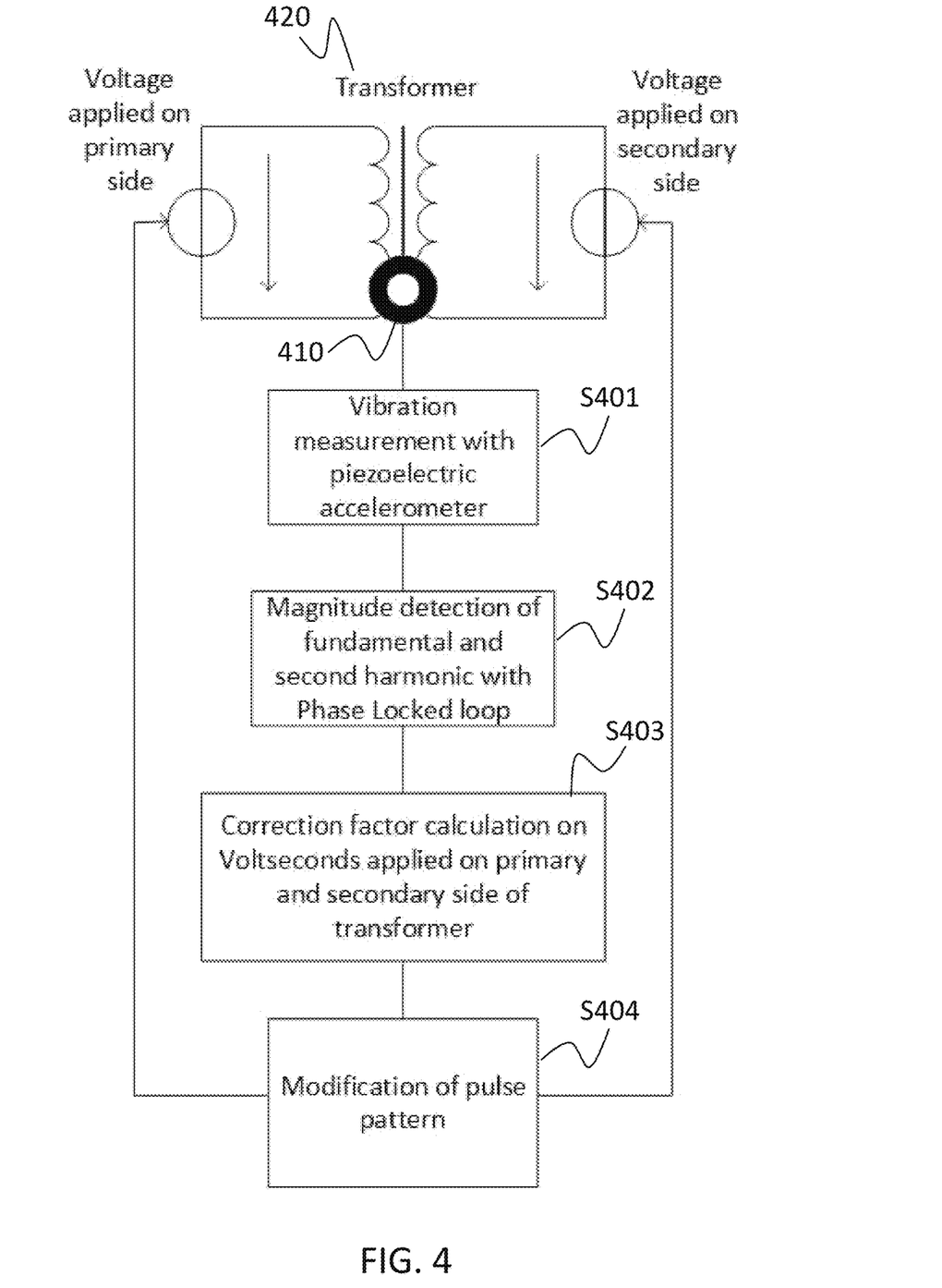
FIG. 4 illustrates an exemplary control method according to an embodiment of the present disclosure.

FIG. 4 illustrates an exemplary control method according to an embodiment of the present disclosure. In particular, the embodiment comprises a transformer 420 which is excited by the transformer excitation voltages applied on primary side and on secondary side. The embodiment further comprises a vibration sensor, in particular a piezoelectric accelerometer, attached to the transformer. In block S401, the vibration of the transformer 420 is sensed using the piezoelectric accelerometer 410. According to an embodiment, the sensed vibration is measured, in particular using the piezoelectric accelerometer 410. In block S402, magnitude of fundamental frequency and second harmonic frequency of the transformer excitation voltages are detected based on the measured vibration, in particular using a Phase Locked Loop, PLL. According to an embodiment, when the magnitude of the fundamental frequency is higher than a first threshold value and/or the magnitude of the second harmonic frequency is lower than a second threshold value, the DC magnetization in the transformer 420 is determined. It is understood by the skilled person that the wording 'determined' may be interchangeably used with the wording 'detected' or the like. Then in block S403, a correction factor on transformer excitation voltage seconds applied on primary side and secondary side of transformer is computed. In block S404, the pulse pattern of the transformer excitation voltages applied on the primary side and the side is modified. The modified transformer excitation voltages are feedback to the transformer on the primary side and the secondary side to mitigate the vibration, in particular caused by the DC magnetization, more particularly leading to the core saturation.

Figure 5A:
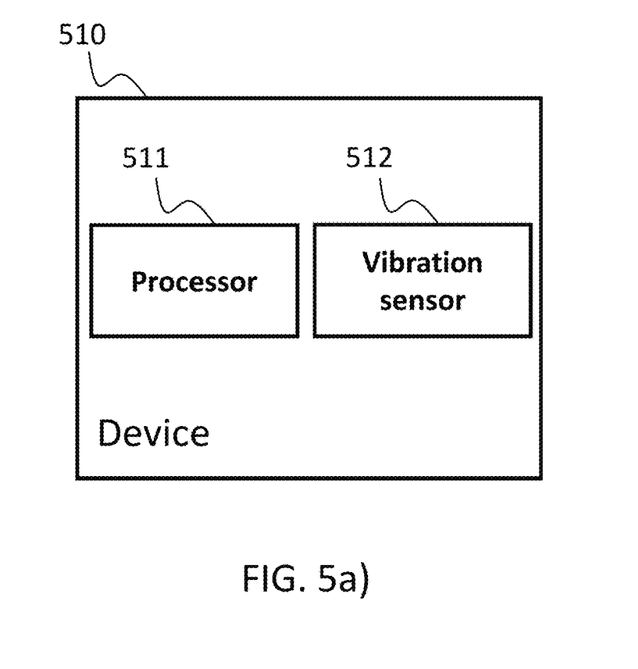
FIG. 5a and FIG. 5b illustrate devices according to embodiments of the present disclosure.

FIG. 5a illustrates a device according to an embodiment of the present disclosure. The device 510 is a device for detecting a DC magnetization in a transformer 520 and controlling the transformer 520, the device comprising: a vibration sensor 512 configured to sense at least one vibration on at least one surface of the transformer 520 or on at least one surface of a component connected to the transformer 520; and a processor 511 being configured to: measure, the sensed at least one vibration; detect, based on the measured at least one vibration, the DC magnetization in the transformer 520; and control, based on the detected DC magnetization, the transformer 520.

According to an embodiment, the at least one vibration sensor is a piezoelectric sensor, in particular a piezoelectric accelerometer.

According to an embodiment, the at least one vibration is generated by the transformer.

According to an embodiment, the processor is configured to detect the DC magnetization in the transformer by identifying, from the measured at least one vibration, a first signal vibrating at a first frequency and/or a second signal vibrating at a second frequency.

According to an embodiment, the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

According to an embodiment, the processor is configured to control the transformer by modifying a pulse pattern of the alternating signal on the primary side of the transformer and/or the secondary side of the transformer.

According to an embodiment, the processor is further configured to compute at least one parameter, in particular on an error correction factor.

According to an embodiment, the processor is configured to control the transformer is or by controlling at least one of voltage, in particular the voltage applied to the transformer, flux, in particular the flux through the core of the transformer, or current. According to an embodiment, the processor is configured to control the transformer by generating at least one signal being an input to the transformer. According to an embodiment, the controlling the transformer is or comprises generating at least one signal being an input to a control loop comprising a model, in particular a mathematical model, more particularly a transfer function, describing an electrical behavioural characteristic of the transformer. According to an embodiment, the processor is configured to generate the at least one signal by adjusting the at least one signal based on the obtained and/or determined data. According to an embodiment, the at least one signal is at least one of voltage, in particular the voltage applied to the transformer, flux, in particular the flux through the core of the transformer, or current. According to an embodiment, the device further comprises a computing unit 517 configured to compute at least one parameter, in particular an error correction factor.

Figure 5B:
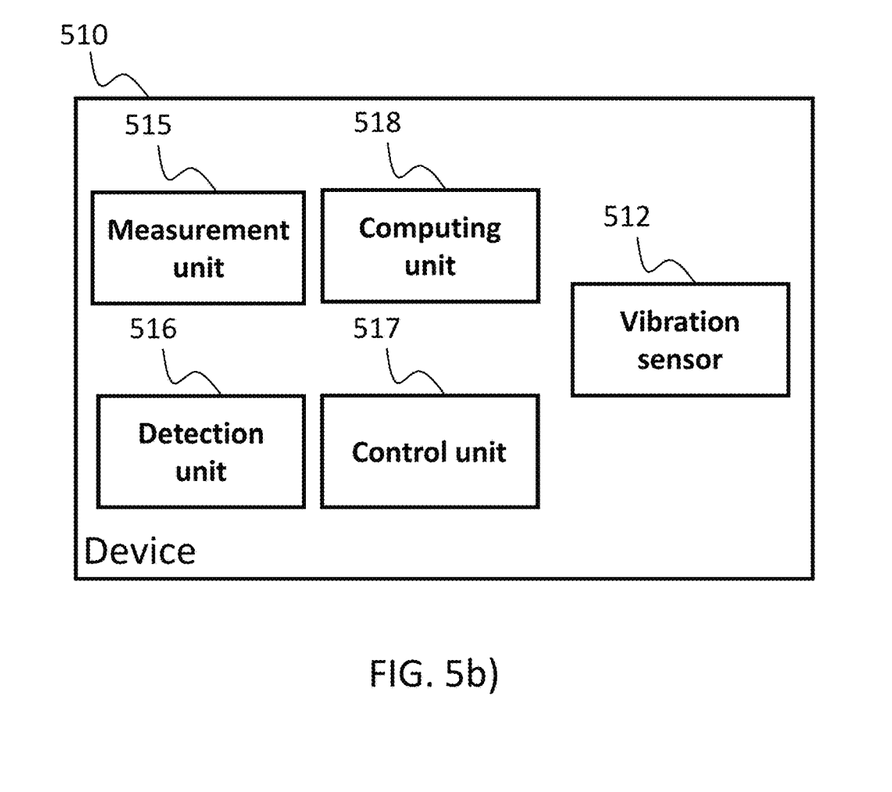

FIG. 5b illustrates a device according to an embodiment of the present disclosure. The device 510 is a device for detecting a DC magnetization in a transformer 520 and controlling the transformer 520, the device comprising: a vibration sensor 512 configured to sense at least one vibration on at least one surface of the transformer 520 or on at least one surface of a component connected to the transformer 520; a measurement unit 515 configured to measure, the sensed at least one vibration; a detection unit 516 configured to detect, based on the measured at least one vibration, the DC magnetization in the transformer 520; and a control unit 517 configured to control, based on the detected DC magnetization, the transformer 520.

According to an embodiment, the vibration sensor is a piezoelectric sensor, in particular a piezoelectric accelerometer.

According to an embodiment, the at least one vibration is generated by the transformer.

According to an embodiment, the detection unit is configured to detect the DC magnetization in the transformer by identifying, from the measured at least one vibration, a first signal vibrating at a first frequency and/or a second signal vibrating at a second frequency.

According to an embodiment, the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

According to an embodiment, the control unit is configured to control the transformer modifying a pulse pattern of the alternating signal on the primary side of the transformer and/or the secondary side of the transformer.

According to an embodiment, the device further comprises a computing unit 517 configured to compute at least one parameter, in particular an error correction factor.

According to an embodiment, the control unit being configured to control the transformer is configured to control voltage, in particular the voltage applied to the transformer, flux, in particular the flux through the core of the transformer, or current.

According to an embodiment, the control unit configured to control the transformer by controlling at least one of voltage, in particular the voltage applied to the transformer, flux, in particular the flux through the core of the transformer, or current. According to an embodiment, the control unit is configured to control the transformer by generating at least one signal being an input to the transformer. According to an embodiment, the control unit is configured to control the transformer by generating at least one signal being an input to a control loop comprising a model, in particular a mathematical model, more particularly a transfer function, describing an electrical behavioural characteristic of the transformer. According to an embodiment, the control unit is configured to generate the at least one signal by adjusting the at least one signal based on the obtained and/or determined data. According to an embodiment, the at least one signal is at least one of voltage, in particular the voltage applied to the transformer, flux, in particular the flux through the core of the transformer, or current.

It is understood by the skilled person that the measurement unit, the detection unit and the control unit can be realized by one or more integrated circuits (IC) and/or one or more processors, in particular one or more general purpose processors. The integrated circuit (IC) can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

Figure 5C:
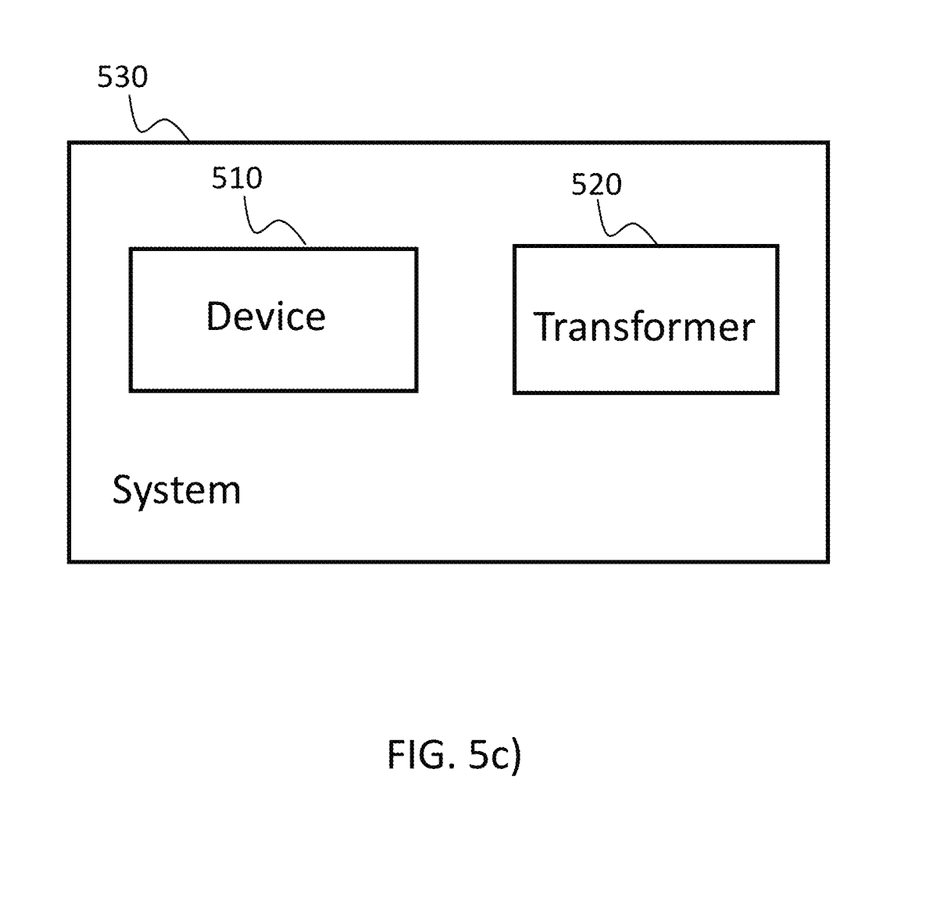
FIG. 5c illustrates a system according to an embodiment of the present disclosure.

FIG. 5c illustrates a system according to an embodiment of the present disclosure. The system 530 comprises a transformer 520 and the device 510 for detecting a DC magnetization in the transformer 520 and controlling the transformer 520. According to an embodiment, the device 510 is the device of FIG. 5a or the device of 5b.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative methods, logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for detecting a DC magnetization in a transformer and controlling the transformer, the method comprising:
    sensing, using at least one vibration sensor, at least one vibration on at least one surface of the transformer or on at least one surface of a component connected to the transformer;
    measuring the sensed at least one vibration;
    detecting, based on the measured at least one vibration, the DC magnetization in the transformer; and
    controlling, based on the detected DC magnetization, the transformer,
    wherein the controlling the transformer comprises generating at least one signal being an input to a control loop comprising a model describing an electrical behavioral characteristic of the transformer, and
    wherein the controlling the transformer comprises modifying a pulse pattern of an alternating signal on the primary side of the transformer and/or the secondary side of the transformer.

2. The method of claim 1, wherein the at least one vibration is generated by the transformer.

3. The method of claim 1, wherein the detecting the DC magnetization in the transformer comprises identifying, from the measured at least one vibration, a first signal vibrating at a first frequency and/or a second signal vibrating at a second frequency.

4. The method of claim 3, wherein the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

5. The method of claim 1, further comprising computing at least one parameter, in particular an error correction factor.

6. The method of claim 1, wherein the controlling the transformer is comprises controlling voltage, in particular the voltage applied to the transformer, flux, in particular the flux through the core of the transformer, or current.

7. A device for detecting a DC magnetization in a transformer and controlling the transformer, the device comprising:
- a vibration sensor configured to sense at least one vibration on at least one surface of the transformer or on at least one surface of a component connected to the transformer;
- a measurement unit configured to measure the sensed at least one vibration;
- a detection unit configured to detect, based on the measured at least one vibration, the DC magnetization in the transformer; and
- a control unit configured to control, based on the detected DC magnetization, the transformer,
- wherein the control unit is configured to control the transformer by generating at least one signal being an input to a control loop comprising a model describing an electrical behavioral characteristic of the transformer,
- and
- wherein the control unit is configured to control the transformer by modifying a pulse pattern of an alternating signal on the primary side of the transformer and/or the secondary side of the transformer.

8. The device of claim 7, wherein the at least one vibration is generated by the transformer.

9. The device of claim 7, wherein the detection unit is configured to detect the DC magnetization in the transformer by identifying, from the measured at least one vibration, a first signal vibrating at a first frequency and/or a second signal vibrating at a second frequency.

10. The device of claim 9, wherein the first frequency is a fundamental frequency of an alternating signal on a primary side of the transformer and/or a secondary side of the transformer, and the second frequency is a second harmonic of the alternating signal on the primary side of the transformer and/or the secondary side of the transformer.

11. The device of claim 7, further comprising a computing unit configured to compute at least one parameter, in particular an error correction factor.

12. The device of claim 7, wherein the control unit is configured to control the transformer by controlling voltage, in particular the voltage applied to the transformer, flux, in particular the flux through the core of the transformer, or current.

13. A system comprising a transformer and the device of claim 7.

* * * * *